(12) United States Patent
King et al.

(10) Patent No.: US 10,142,305 B2
(45) Date of Patent: *Nov. 27, 2018

(54) LOCAL SECURITY KEY GENERATION

(71) Applicant: Verizon Patent and Licensing Inc., Arlington, VA (US)

(72) Inventors: William C. King, Lafayette, CA (US); Priscilla Lau, Fremont, CA (US); Kwai Yeung Lee, Pittsburg, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 269 days.

This patent is subject to a terminal disclaimer.

(21) Appl. No.: 15/049,407

(22) Filed: Feb. 22, 2016

(65) Prior Publication Data
US 2016/0173463 A1 Jun. 16, 2016

Related U.S. Application Data

(63) Continuation of application No. 13/174,644, filed on Jun. 30, 2011, now Pat. No. 9,270,453.

(51) Int. Cl.
*H04L 29/06* (2006.01)
*H04L 9/08* (2006.01)

(52) U.S. Cl.
CPC .......... *H04L 63/062* (2013.01); *H04L 9/0866* (2013.01); *H04L 63/08* (2013.01)

(58) Field of Classification Search
CPC ...... H04L 63/062; H04L 63/08; H04L 9/0866
See application file for complete search history.

(56) References Cited

U.S. PATENT DOCUMENTS

| | | | |
|---|---|---|---|
| 5,986,568 A | 11/1999 | Suzuki et al. |
| 7,136,651 B2 | 11/2006 | Kalavade |
| 7,386,878 B2 | 6/2008 | Fernando et al. |
| 7,954,141 B2 | 5/2011 | De Lutiis et al. |
| 8,230,035 B2 | 7/2012 | Morgan et al. |

(Continued)

OTHER PUBLICATIONS

"3rd Generation Partnership Project; Technical Specification Group Services and System Aspects; 3GPP System Architecture Evolution (SAE); Security Architecture (Release 9)," 3GPP TS 33.401, pp. 1-105, Dec. 2010.

(Continued)

*Primary Examiner* — Terrell S Johnson

(57) ABSTRACT

A calling device may obtain a first calling security parameter by registering with a network and obtain a second calling security parameter in response to causing an application authentication architecture of the network to verify that that the calling device is authorized to access a network service corresponding to a communication application stored by the calling device. The calling device may communicate the first and second calling security parameters to a called device and receive first and second called security parameters from the called device in response to communicating the first and second calling security parameters. The calling device may generate a security key based on the first calling security parameter, the second calling security parameter, first called security parameter, and the second called security parameter, and use the security key to encrypt or decrypt communication between the calling device and the called device.

20 Claims, 10 Drawing Sheets

(56) References Cited

U.S. PATENT DOCUMENTS

| | | |
|---|---|---|
| 8,353,011 B2 | 1/2013 | Bajko et al. |
| 2003/0177401 A1 | 9/2003 | Arnold et al. |
| 2004/0145773 A1 | 7/2004 | Oakeson et al. |
| 2006/0205387 A1 | 9/2006 | Laitinen |
| 2007/0294186 A1* | 12/2007 | Yan ............... G06Q 20/3829 705/71 |
| 2008/0065891 A1 | 5/2008 | Karamchedu et al. |
| 2008/0133761 A1 | 6/2008 | Polk |
| 2008/0307511 A1 | 12/2008 | Ahtisaari |
| 2009/0063851 A1 | 3/2009 | Nijdam |
| 2009/0067628 A1 | 3/2009 | Pudney et al. |
| 2009/0089583 A1 | 4/2009 | Patel |
| 2009/0094457 A1 | 4/2009 | Lapstun et al. |
| 2009/0158034 A1 | 6/2009 | Gu et al. |
| 2009/0180614 A1 | 7/2009 | Rajagopal et al. |
| 2010/0030904 A1 | 2/2010 | Oda et al. |
| 2010/0054472 A1 | 3/2010 | Barany et al. |
| 2010/0153726 A1 | 6/2010 | Liu et al. |
| 2010/0268937 A1 | 10/2010 | Blom et al. |
| 2010/0273455 A1 | 10/2010 | Tamura et al. |
| 2011/0055565 A1 | 3/2011 | Murakami et al. |
| 2011/0091036 A1 | 4/2011 | Norrman et al. |
| 2011/0167272 A1 | 7/2011 | Kolesnikov |
| 2011/0185070 A1 | 7/2011 | Xue et al. |
| 2011/0206206 A1* | 8/2011 | Blom ................... H04L 9/083 380/279 |
| 2012/0027211 A1 | 2/2012 | Lehtovirta et al. |
| 2012/0109830 A1 | 5/2012 | Vogel |
| 2012/0204027 A1 | 8/2012 | Baek et al. |
| 2012/0233327 A1* | 9/2012 | Smith ................ H04L 65/1073 709/225 |
| 2012/0311329 A1 | 12/2012 | Medina et al. |
| 2012/0322416 A1 | 12/2012 | Sundaram et al. |
| 2013/0024686 A1 | 1/2013 | Drucker |
| 2013/0060708 A1 | 3/2013 | Oskolko et al. |
| 2013/0085880 A1 | 4/2013 | Roth et al. |
| 2013/0091556 A1 | 4/2013 | Horn et al. |
| 2013/0315389 A1 | 11/2013 | Jung et al. |

OTHER PUBLICATIONS

"3rd Generation Partnership Project; Technical Specification Group Services and System Aspects; Generic Authentication Architecture (GAA); Generic Bootstrapping Architecture (Release 9)," 3GPP TS 33.220, V9.3.0, pp. 1-75, Jun. 2010.

"3rd Generation Partnership Project; Technical Specification Group Services and System Aspects; Key Establishment Between a Universal Integrated Circuit Card (UICC) and a Terminal (Release 9)," 3GPP TS 33.110, V9.0.0, pp. 1-28, Dec. 2009.

* cited by examiner

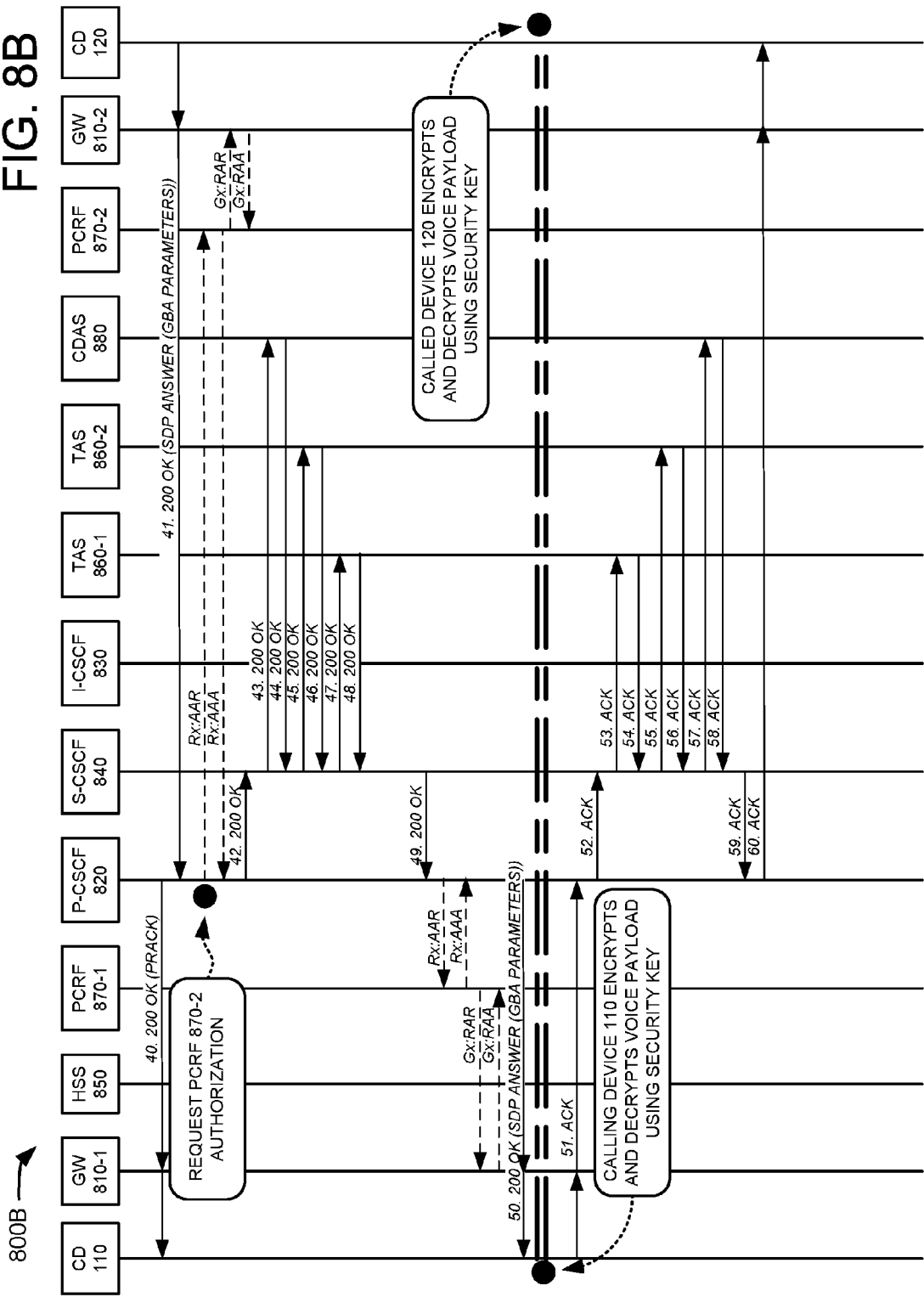

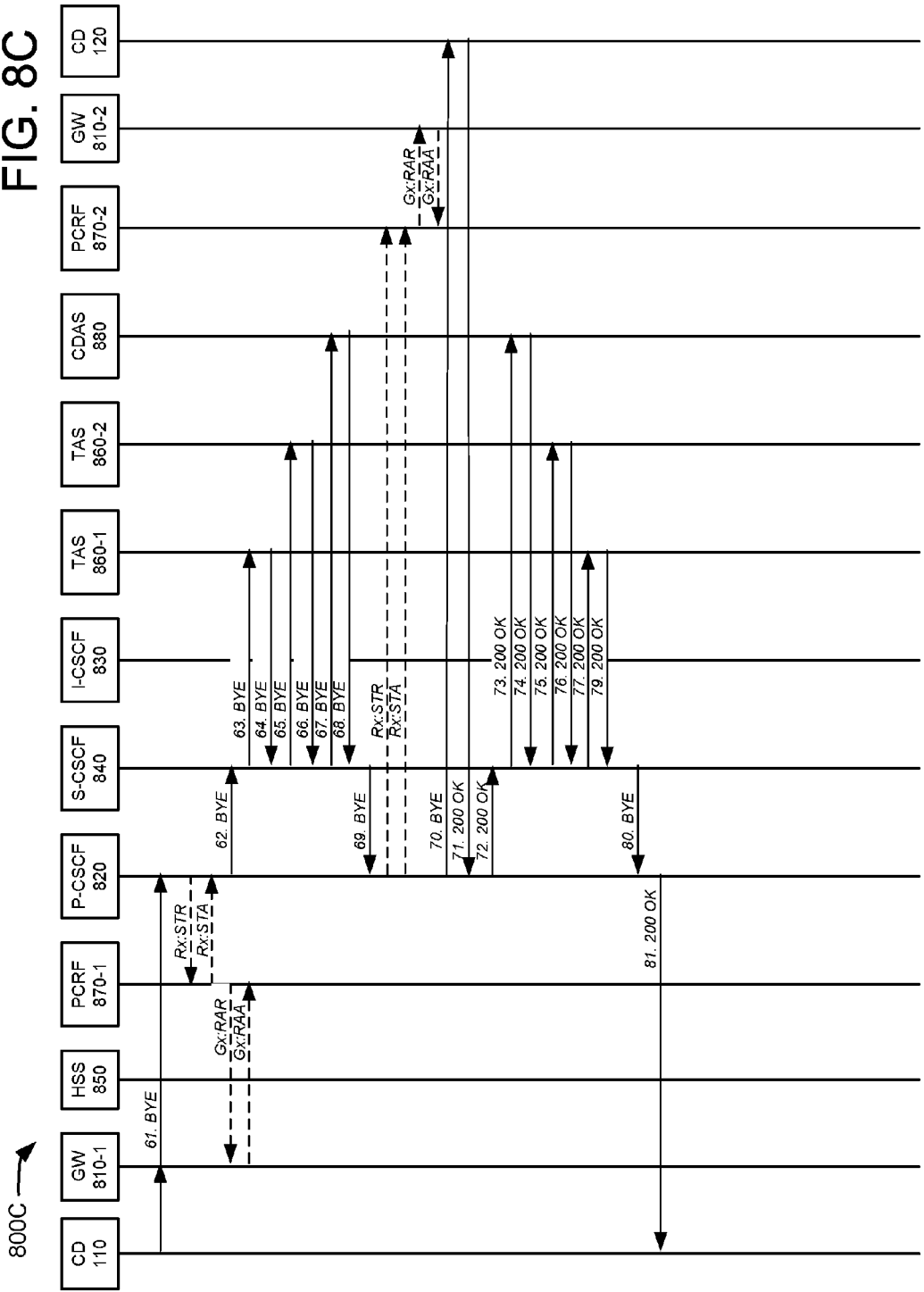

LOCAL SECURITY KEY GENERATION

CROSS REFERENCE TO RELATED APPLICATIONS

This application is a continuation of U.S. patent application Ser. No. 13/174,644 filed on Jun. 30, 2011, the disclosure of which is hereby incorporated herein by reference in its entirety.

BACKGROUND

Current network communication technologies include various approaches to network security. For example, in many networks, user devices are assigned security keys (also referred to as cipher keys) for encrypting and decrypting messages communicated over the network. However, such technologies often include various deficiencies. For instance, assigning security keys to user devices often involves a third device (e.g., a key management system) to assign the security keys, which can introduce security risks and increase operational complexity within the network.

BRIEF DESCRIPTION OF THE DRAWINGS

FIGS. 8A-8C are diagrams of an example call session according to one or more implementations described herein.

DETAILED DESCRIPTION OF PREFERRED EMBODIMENTS

The following detailed description refers to the accompanying drawings. The same labels and/or reference numbers in different drawings may identify the same or similar elements.

In one or more implementations, described herein, devices may be used to locally generate security keys. For example, a calling device may receive calling security parameters by registering with a network and demonstrating that the calling device is authorized to access a particular network service (e.g., a voice over Internet Protocol (IP) (VoIP) service) and/or use a particular communication application (e.g., a VoIP application). The calling device may communicate the calling security parameters to a called device and, in response, receive called security parameters from the called device. The calling device and the called device may each execute a key generation function based on the calling security parameters and the called security parameters to locally generate security keys for encryption and decryption purposes.

Figure 1:
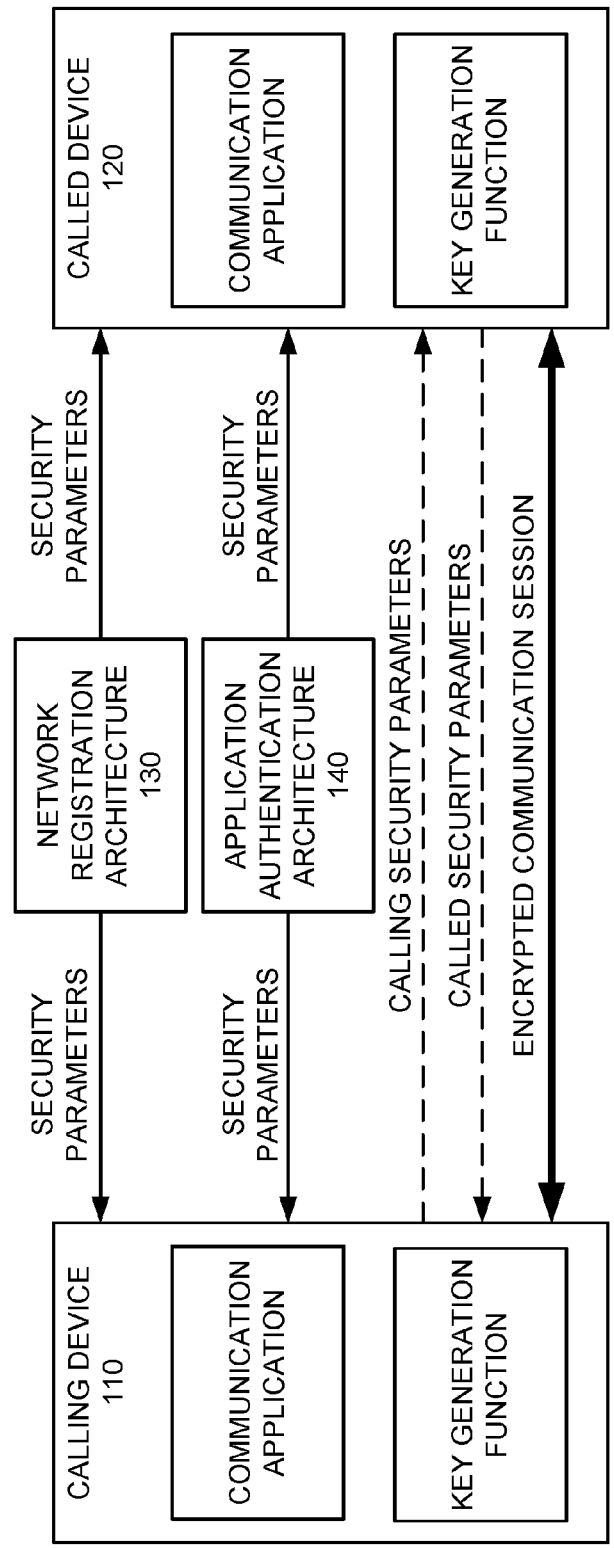
FIG. 1 is a diagram of an example overview of an implementation described herein.

FIG. 1 is a diagram of an example overview 100 of an implementation described herein. As depicted, overview 100 may include calling device 110, called device 120, network registration architecture 130, and application authentication architecture 140. In some implementations, the systems and devices of FIG. 1 may correspond to one or more systems or device discussed elsewhere in this specification.

Calling device 110 and called device 120 may each include one or more of a variety of devices, such as a telephone, a smart phone, a laptop computer, a tablet computer, a desktop computer, a server, or another type of computing or communication device. For example, calling device 110 and called device 120 may each be a smart phone. However, in another example, calling device 110 may include a tablet computer, and called device 120 may include a network application server. In yet another example, calling device 110 and called device 120 may each be application servers.

Calling device 110 may include a device that sends a communication session invitation (e.g., a call session invitation, a session initiation protocol (SIP) INVITE message, etc.), and called device 120 may include a device that receives the communication session invitation. However, in some implementations, called device 120 may also be capable of sending a communication session invitation, and calling device 110 may be capable of receiving the communication session invitation. In certain implementations, therefore, a particular device (e.g., a smart phone) may operate as calling device 110 in one scenario and called device 120 in another scenario.

As depicted, calling device 110 and called device 120 may include communication applications. The communication applications may enable calling device 110 and called device 120 to communicate with one another via a particular type of network service. For example, a communication application may include a VoIP application, a simple message service (SMS) application, an instant messaging (IM) application, a video conference application, or another type of communication application. In some implementations, before a communication application may be used, application authentication architecture 140 may perform one or more authentication or authorization processes to verify that calling device 110 or called device 120 are authorized to use the communication applications and/or corresponding network service.

Additionally, or alternatively, calling device 110 and called device 120 may include key generation functions. The key generation functions may enable calling device 110 and called device 120 to generate a security key based on one or more security parameters. In certain implementations, the key generation function of the calling device 110 and the key generation function of the called device 120 may be the same. For example, in some implementations, if the same parameters are inputted into the key generation function of the calling device 110 and the key generation function of the called device 120, the outputs of both key generation functions may be the same.

Network registration architecture 130 may include one or more of a variety of computing devices. For example, network registration architecture 130 may include a desktop computer, a server, a cluster of servers, or one or more other types of computing or communication devices. In some implementations, network registration architecture 130 may be capable of registering calling device 110 or called device 120 with a network (e.g., an IP multimedia subsystem (IMS) network). In some implementations, network registration architecture 130 may include one or more IMS network devices (not shown in FIG. 1), such as one or more call session control function (CSCF) devices (e.g., a proxy-CSCF (P-CSCF) device, an interrogating-CSCF (I-CSCF) device, a serving-CSCR (S-CSCF) device, etc.), a home subscriber server (HSS), and/or one or more other types of IMS devices.

Similarly, application authentication architecture 140 may include one or more of a variety of computing devices. For example, application authentication architecture 140 may include a desktop computer, a server, a cluster of servers, or one or more other types of computing or communication devices. In some implementations, application authentication architecture 140 may provide one or more of a variety of authentication and/or authorization services to enable calling device 110 and called device 120 to communicate with one another via a particular network service and/or a particular communication application.

In certain implementations, application authentication architecture 140 may include a generic bootstrap architecture (GBA). Additionally, or alternatively, application authentication architecture 140 may include one or more bootstrapping server functions (BSFs), one or more network application functions (NAFs), or one or more additional or alternative functions or devices for providing authentication and authorization services. For instance, in some implementations, application authentication architecture 140 may communicate or otherwise cooperate with the devices of network registration architecture 130 (e.g., a HSS) in order to provide authentication and authorization services.

As depicted, calling device 110 or called device 120 may receive one or more security parameters from network registration architecture 130. In some implementations, the security parameters from network registration architecture 130 may be received during, or in response to, calling device 110 or called device 120 registering with a network via network registration architecture 130. Additionally, or alternatively, calling device 110 or called device 120 may receive one or more security parameters from application authentication architecture 140. In some implementations, the security parameters from application authentication architecture 140 may be received in response to application authentication architecture 140 (e.g., a BSF) verifying that calling device 110 or called device 120 is authorized to access a particular network communication service or in response to application authentication architecture 140 (e.g., a NAF) verifying that calling device 110 or called device 120 is authorized to use a particular communication application.

Calling device 110 may communicate one or more of the security parameters received from network registration architecture 130 and application authentication architecture 140 to called device 120. Similarly, called device 120 may communicate one or more of the security parameters received from network registration architecture 130 and application authentication architecture 140 to calling device 110. In some implementations, this may ensure that calling device 110 and called device 120 apply the same security parameters to the key generation functions in order to generate security keys that complement one another. Additionally, or alternatively, calling device 110 or called device 120 may use security keys to encrypt and decrypt a communication session (e.g., a VoIP call session).

Figure 2:
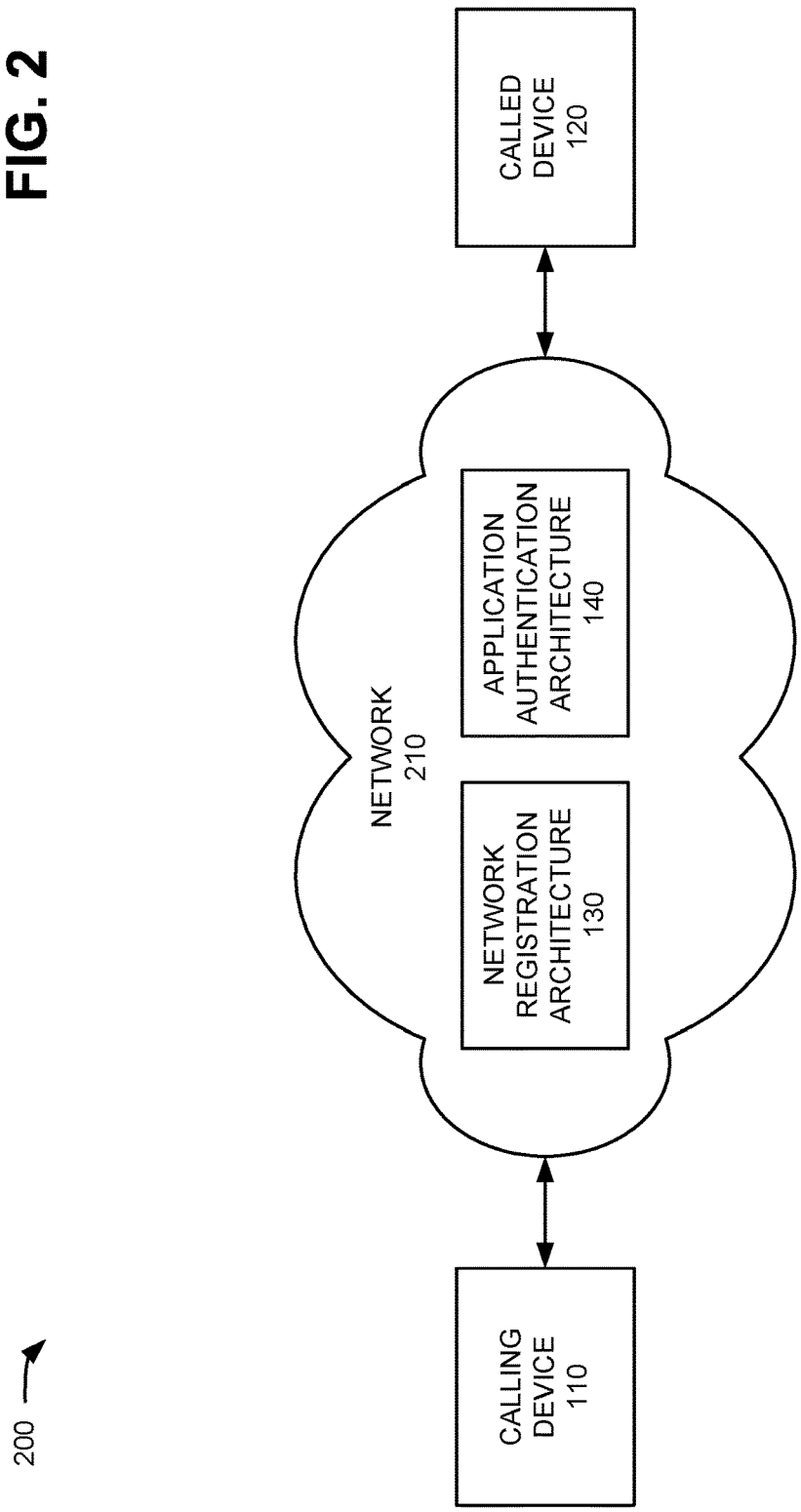
FIG. 2 is a diagram of an example environment in which systems and/or methods, described herein, may be implemented.

FIG. 2 is a diagram of an example environment 200 in which systems and/or methods, described herein, may be implemented. As depicted, environment 200 may include calling device 110, called device 120, network registration architecture 130, application authentication architecture 140, and network 210. While FIG. 2 shows a particular number and arrangement of networks and devices, in alternative implementations, environment 200 may include additional networks or devices, fewer networks or devices, different networks or devices, or differently arranged networks or devices than those depicted in FIG. 2.

Calling device 110, called device 120, network registration architecture 130, and application authentication architecture 140 are each described above with reference to FIG. 1. Network 210 may include any type of network or combination of networks. For example, network 210 may include a local area network (LAN) (e.g., an Ethernet network), a wireless LAN (WLAN) (e.g., an IEEE 802.11x network), a wide area network (WAN) (e.g., the Internet), or a wireless WAN (WWAN) (e.g., a Long-Term Evolution (LTE) network, a High-Speed Packet Access (HSPA) network, an Evolved High Rate Packet Data (eHRPD) network, etc). Network 210 may also, or alternatively, include an IMS network, a fiber optic (e.g., a fiber optic service (FiOS)) network, a VoIP network, a metropolitan area network (MAN), an ad hoc network, or a telephone network (e.g., a Public Switched Telephone Network (PSTN)).

For example, in some implementations, network 210 may include one or more LTE access networks connected to an IMS network. In such implementations, calling device 110 or called device 120 may include one or more LTE-enabled user devices (e.g., a smart phone, a tablet computer, a laptop computer, etc.). Additionally, or alternatively, network registration architecture 130 may include a P-CSCF device, an I-CSCF device, an S-CSCF device, an HSS, and/or one or more other types of network devices. In such implementations, application authentication architecture 140 may include a GBA, a BSF, one or more NAFs, and/or one or more other types of functions, systems, or devices relating to authentication.

Figure 3:
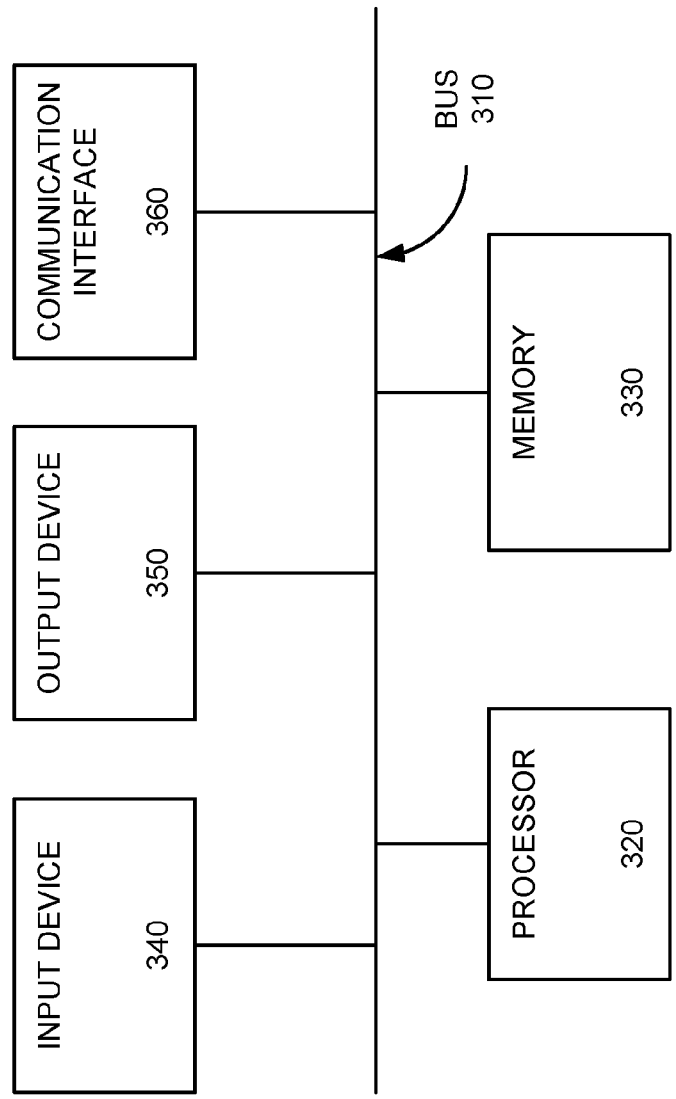
FIG. 3 is a diagram of example components of a device according to one or more implementations described herein.

FIG. 3 is a diagram of example components of a device 300 according to one or more implementations described herein. Device 300 may correspond to calling device 110, called device 120, network registration architecture 130, and/or application authentication architecture 140. Each of calling device 110, called device 120, network registration architecture 130, and/or application authentication architecture 140 may include one or more devices 300 or one or more of the components of device 300. As depicted, device 300 may include bus 310, processor 320, memory 330, input device 340, output device 350, and communication interface 360. However, in other implementations, device 300 may include fewer components, additional components, different components, or differently arranged components than those illustrated in FIG. 3.

Bus 310 may include one or more component subsystems or communication paths that enable the components of device 300 to communicate. Processor 320 may include one or more processors, microprocessors, data processors, co-processors, network processors, application-specific integrated circuits (ASICs), controllers, programmable logic devices (PLDs), chipsets, field-programmable gate arrays (FPGAs), or other types of components that may interpret or execute instructions or data. Processor 320 may control the overall operation, or a portion thereof, of device 300, based on, for example, an operating system and/or various applications. Processor 320 may access instructions from memory 330, from other components of device 300, or from a source external to device 300 (e.g., a network or another device).

Memory 330 may include memory and/or secondary storage. For example, memory 330 may include random access memory (RAM), dynamic RAM (DRAM), read-only memory (ROM), programmable ROM (PROM), flash memory, or some other type of memory. Memory 330 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Input device 340 may include one or more components that permit a user to input information into device 300. For example, input device 340 may include a keypad, a button, a switch, a knob, fingerprint recognition logic, retinal scan logic, a web cam, voice recognition logic, a touchpad, an input port, a microphone, a display, or some other type of input component. Output device 350 may include one or more components that permit device 300 to output information to a user. For example, output device 350 may include a display, light-emitting diodes (LEDs), an output port, a speaker, or some other type of output component.

Communication interface 360 may include one or more components that permit device 300 to communicate with other devices or networks. For example, communication interface 360 may include some type of wireless or wired interface. Communication interface 330 may also include an antenna (or a set of antennas) that permit wireless communication, such as the transmission and reception of radio frequency (RF) signals.

As described herein, device 300 may perform certain operations in response to processor 320 executing software instructions contained in a computer-readable medium, such as memory 330. The software instructions may be read into memory 330 from another computer-readable medium or from another device via communication interface 360. The software instructions contained in memory 330 may cause processor 320 to perform one or more processes described herein. Alternatively, hardwired circuitry may be used in place of, or in combination with, software instructions to implement processes described herein. Thus, implementations described herein are not limited to any specific combination of hardware circuitry and software.

Figure 4:
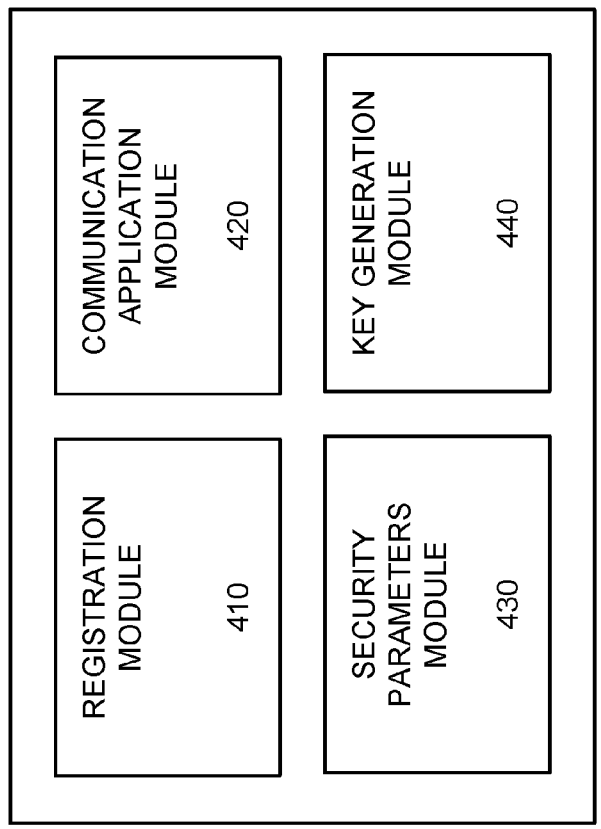
FIG. 4 is a diagram of example functional components corresponding to one or more implementations described herein.

FIG. 4 is a diagram of example functional components 400 corresponding to one or more implementations described herein. For example, calling device 110 or called device 120 may include functional components 400. As depicted, functional components 400 may include registration module 410, communication application module 420, security parameters module 430, and key generation module 440. Depending on the implementation, one or more of modules 410-440 may be implemented as a combination of hardware and software based on the components illustrated and described with respect to FIG. 3. Alternatively, modules 410-440 may each be implemented as hardware based on the components illustrated and described with respect to FIG. 3. While FIG. 4 shows a particular number and arrangement of modules, in alternative implementations, functional components 400 may include additional modules, fewer modules, different modules, or differently arranged modules than those depicted.

Registration module 410 may provide calling device 110 or called device 120 with functionality regarding network registration. For example, network registration module 410 may communicate with network registration architecture 130 to register with network 210, which may include establishing a communication session (e.g., a SIP session) with network 210. Additionally, or alternatively, network 210 may associate the communication session with a random number (e.g., a RAND, a RAND_ID, a session identifier, etc.) or other data structure that may be used to setup and identify the communication session. As described below, a RAND may also be used as a security parameter for generating a security key.

In some implementations, by registering with network 210, calling device 110 or called device 120 may be granted access to one or more network services (e.g., standard calling services, Internet access, etc.). However, other network services (e.g., VoIP services, SMS services, IM services, video conferencing services, etc.) may require one or more additional authentication or authorization processes. For example, obtaining access to network services, corresponding to a particular communication, application may require application authentication architecture 140 to perform one or more application authentication procedures as described herein.

Communication application module 420 may provide calling device 110 or called device 120 with functionality regarding communication applications. For instance, communication application module 420 may include a VoIP application that enables calling device 110 or called device 120 to communicate over network 210 via VoIP. In implementations where a communication application requires authentication, communication application module 420 may communicate with application authentication architecture 140 to complete the authentication process.

Application authentication architecture 140 may communicate with network registration architecture 130 (e.g., HSS) to determine whether calling device 110 or called device 120 is authorized for a particular network service (e.g., a VoIP service, SMS service, etc.). Application authentication architecture 140 may also, or alternatively, associate an authentication or authorization process with a transaction identifier (e.g., a bootstrapping transaction identifier (B-TID)) in order to track the process. Additionally, or alternatively, a NAF identifier (e.g., a NAF_ID) may be used to derive a NAF key (e.g., an external NAF key, Ks_ext_NAF, etc.), and a NAF key may be submitted to a NAF so that calling device 110 or called device 120 may, for example, use a stored communication application to gain access to a particular network service.

Security parameters module 430 may provide calling device 110 or called device 120 with functionality regarding security parameters. For instance, security parameters module 430 may collect security parameters (e.g., a RAND_ID) received by network registration module 410 during a network registration process, or security parameters (e.g., a B-TID, Ks_ext_NAF, etc.) received by communication application module 420 during an authentication or authorization process. Security parameters module 430 may also, or alternatively, collect one or more security parameters that may be available locally. Examples of such parameters may include a telephone number or another type of identifier associated with calling device 110 (e.g., a CALLING_ID), a telephone number or another type of identifier associated with called device 120, and/or an identifier associated with a network service or network application function (e.g., a NAF_ID).

Security parameters module 430 may communicate one or more security parameters to called device 120 and, in response, receive one or more security parameters from called device 120. Alternatively, security parameters module 430 may receive one or more security parameters from calling device 110 and, in response, collect and communicate security parameters to the calling device 110. In some implementations, security parameters collected by, communicated by, or otherwise corresponding to calling device 110 may be identified as calling security parameters (e.g., CALLING_RAND_ID, CALLING_B-TID, etc.). Similarly, security parameters collected by, communicated by, or otherwise corresponding to called device 120 may be identified as called security parameters (e.g., CALLED_RAND_ID, CALLED_B-TID, etc.).

Key generation module 440 may provide calling device 110 or called device 120 with functionality regarding security keys. For example, key generation module 440 may generate a security key based on one or more of the security parameters collected or otherwise obtained by security parameters module 430. In some implementations, key generation module 440 may generate a security key by executing one or more key generation functions, which may include a key derivation function (KDF) or another type of hash function. In some implementations, a KDF may be implemented according to one or more communication standards, such as the 3rd Generation Partnership Project (3GPP). As mentioned above, a security key may be used to encrypt and decrypt data structures (e.g., IP packets) of a communication session.

Figure 5:
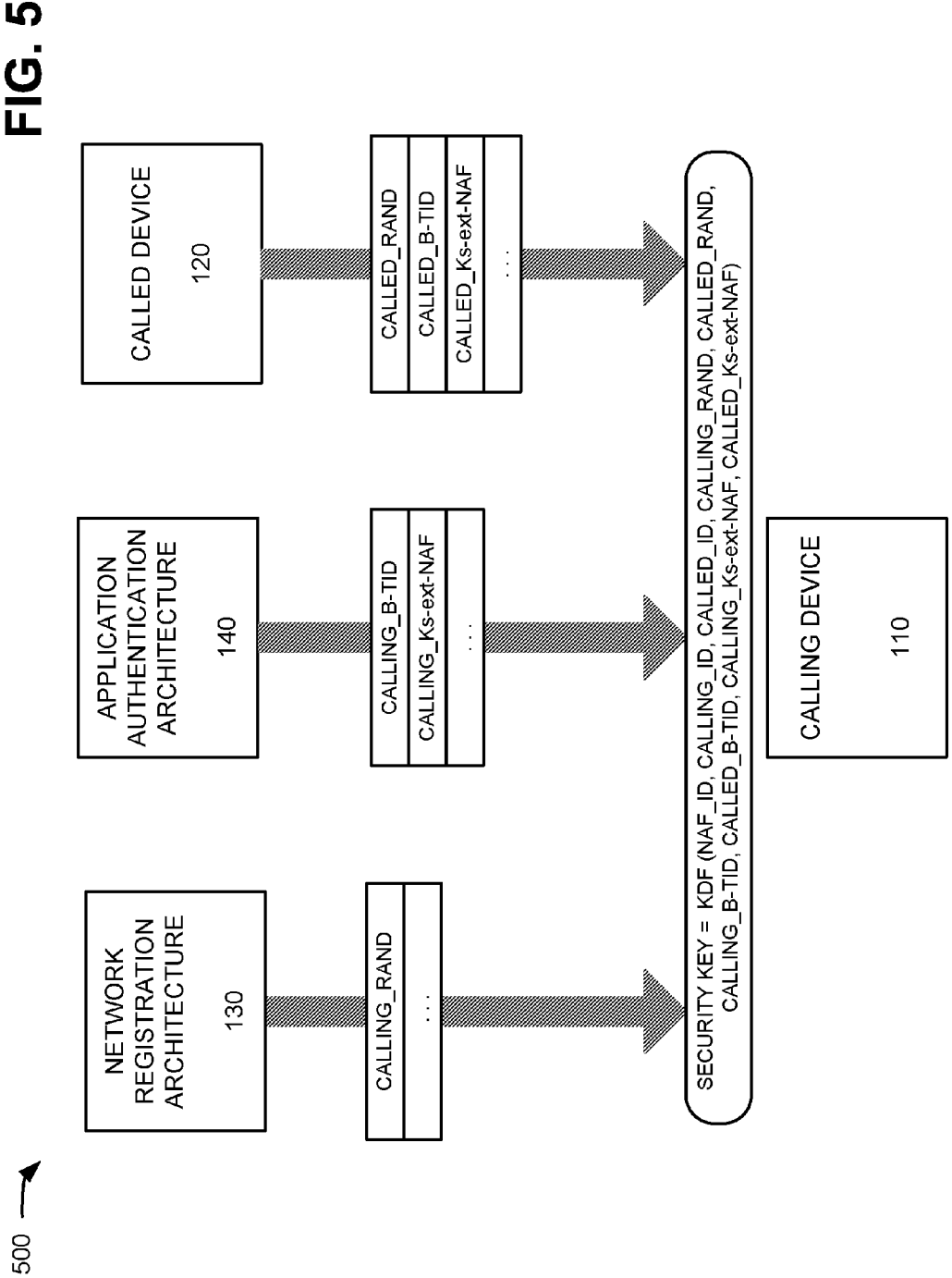
FIG. 5 is a diagram of an example data flow according to one or more implementations described herein.

FIG. 5 is a diagram of an example data flow 500 for generating a security key according to one or more implementations described herein. Example data flow 500 is presented from the perspective of calling device 110 collecting or otherwise obtaining security parameters. A similar or analogous data flow could be applicable to called device 120.

As depicted, security parameters may be obtained by calling device 110 from different sources and at different times. For example, calling device 110 may receive a CALLING_RAND parameter or another type of security parameter from network registration architecture 130 while registering with network 210. Additionally, or alternatively, calling device 110 may receive a CALLING_B-TID parameter, a CALLING_Ks-ext-NAF parameter, or one or more other types of security parameters while communicating with application authentication architecture 140 to, for example, obtain authorization to access a particular network service or use a particular communication application.

Calling device 110 may also, or alternatively, receive a CALLED_RAND parameter, a CALLED_B-TID parameter, a CALLED_Ks-ext-NAF parameter, or one or more other types of security parameters in response to sending one or more calling security parameters (e.g., a CALLING_RAND parameter, a CALLING_B-TID parameter, a CALLING_Ks-ext-NAF parameter, etc.) to called device 120. In some implementations, one or more security parameters may be locally available to calling device 110 (e.g., a NAF_ID parameter, a CALLING_ID parameter, a CALLED_ID parameter, etc.).

As illustrated, one or more of the foregoing parameters may be inserted or otherwise applied to a key generation function (e.g., a KDF) to generate a security key. The security key may be used to encrypt or decrypt messages or other information sent to and from called device 120. As mentioned above, data flow 500 provides an example for generating a security key from the perspective of calling device 110. As described below with reference to FIGS. 7-8C, an analogous data flow could be applied to called device 120.

Figure 6:
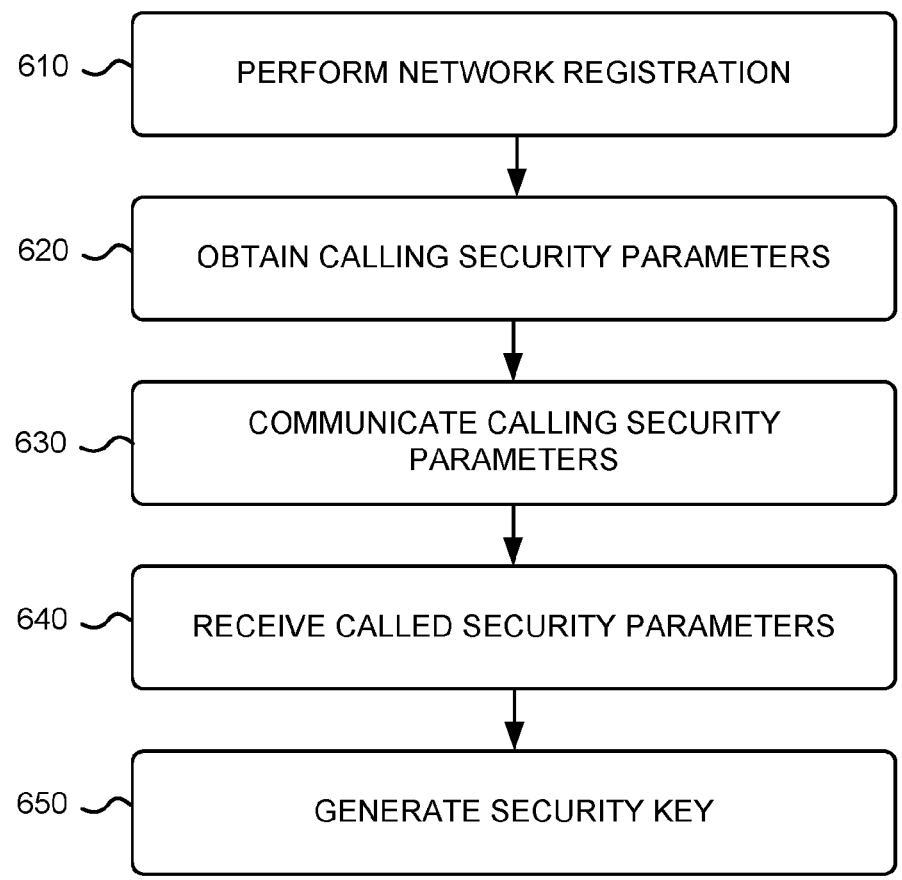
FIG. 6 is a diagram of an example process for generating a security key according to one or more implementations described herein.

FIG. 6 is a diagram of an example process 600 for generating a security key according to one or more implementations described herein. Process 600 may be performed by, or otherwise correspond to, calling device 110. In one or more implementations, process 600 may be performed by one or more components of calling device 110. In other implementations, one or more blocks of process 600 may be performed by one or more other components/devices, or a group of components/devices, including or excluding calling device 110.

Process 600 may include registering with network 210 (block 610). For example, calling device 110 may communicate with network registration architecture 130 to register with network 210. In some implementations, registering with network 210 may enable calling device 110 to, for example, obtain access to some network services, such as standard calling services, Internet services, television services, or one or more other types of network services. As mentioned above, however, some network services may require calling device 110, or one or more communication applications of calling device 110, to be authenticated by application authentication architecture 140.

Calling security parameters may be obtained (block 620). For instance, calling device 110 may obtain calling security parameters from various sources or at various times. In some implementations, calling device 110 may obtain a CALLING_RAND parameter from network registration architecture 130 in response to registering with network 210. Calling device 110 may also, or alternatively, obtain a CALLING_B-TID parameter or a CALLING_Ks-ext-NAF parameter from interacting with application authentication architecture 140. Calling device 110 may also obtain security parameters that are locally available, such as a NAF_ID parameter, a CALLING_ID parameter, or a CALLED_ID parameter.

Calling security parameters may be communicated (block 630). For example, calling device 110 may send parameters to called device 120. In certain implementations, calling device 110 may communicate one or more calling security parameters using a session initiation message, such as a SIP INVITE message. In such implementations, security parameters may be included in the SIP INVITE message by using session description protocol (SDP).

Called security parameters may be received (block 640). For example, calling device 110 may receive called security parameters from called device 120. As discussed above with reference to FIG. 5, called security parameters may include a CALLED_RAND parameter, a CALLED_B-TID parameter, a CALLED_Ks-ext-NAF parameter, and/or one or more other types of security parameters, such as a CALLED_ID parameter, a CALLING_ID parameter, or a NAT_ID parameter. In some implementations, one or more of the security parameters sent by called device 120 may already be locally available to calling device 110. However, calling device 120 may use such security parameters (e.g., redundant security parameters) to verify that calling device 110 and called device 120 will be applying the same parameters to the key generation function.

A security key may be generated (block 650). For instance, calling device 110 may generate a security key using one or more key generation functions, as described above. Additionally, or alternatively, the security key may be based on the calling security parameters and/or the called security parameters collected or obtained by calling device 110.

While FIG. 6 shows a flowchart diagram of an example process 600 for generating a security key, in other implementations, a process for generating a security key may include fewer operations, different operations, differently arranged operations, or additional operations than depicted in FIG. 6.

Figure 7:
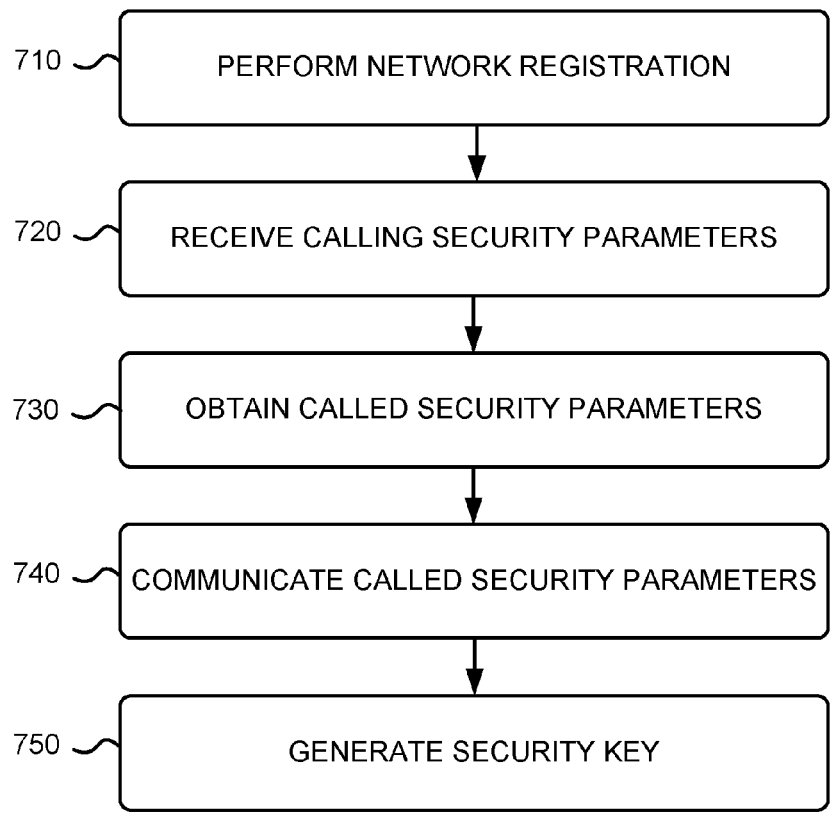
FIG. 7 is a diagram of another example process for generating a security key according to one or more implementations described herein.

FIG. 7 is a diagram of an example process 700 for generating a security key according to one or more implementations described herein. As depicted, process 700 may include one or more operations that are similar or analogous to the process of FIG. 6. However, while the process of FIG. 6 may be performed by calling device 110, process 700 may be performed by called device 120. For instance, in one or more implementations, process 700 may be performed by one or more components of called device 120. In other implementations, one or more blocks of process 700 may be performed by one or more other components/devices, or a group of components/devices, including or excluding called device 120.

Process 700 may include registering with network 210 (block 710). For example, called device 120 may register with network 210. In some implementations, called device 120 may register with network 210 by communicating with network registration architecture 130. In certain implementations, registering with network 210 may enable called device 120 to, for example, obtain access to one or more network services, such as standard calling services, Internet services, television services, or one or more other types of network services. However, some network services may require called device 120, or a communication application of called device 120, to be authenticated by application authentication architecture 140.

Calling security parameters may be received (block 720). For instance, called device 120 may receive one or more calling security parameters from calling device 110. The calling security parameters may be included in a session initiation message (e.g., a SIP INVITE message). In certain implementations, the calling security parameters may include a NAF_ID parameter, a CALLING_ID parameter, a CALLED_ID parameter, a CALLING_RAND parameter, a CALLING_B-TID parameter, a CALLING_Ks-ext-NAF parameter, or one or more other types of security parameters. In some implementations, one or more of the security parameters sent by calling device 110 may already be locally available to called device 120. However, called device 120 may use the security parameters (e.g., the redundant security parameters) to verify that calling device 110 and called device 120 are applying the same parameters to the key generation function.

Called security parameters may be obtained (block 730). For example, called device 120 may obtain called security parameters from one or more sources or at one or more times. For example, called device 120 may obtain a CALLED_RAND parameter from network registration architecture 130 in response to registering with network 210. Called device 120 may also, or alternatively, obtain a CALLED_B-TID parameter, a CALLED_Ks-ext-NAF parameter, or another type of security parameter as a result of interacting with application authentication architecture 140. Called device 120 may also, or alternatively, obtain security parameters that are available locally, such as a NAF_ID parameter, a CALLING_ID parameter, or a CALLED_ID parameter.

Called security parameters may be communicated (block 740). For instance, called device 120 may send, or otherwise communicate, called security parameters to calling device 110. In some implementations, called device 120 may communicate called security parameters in response to, for example, receiving a communication session invitation (e.g., a SIP INVITE message) with calling security parameters from calling device 110. In such implementations, calling device 110 may respond by sending the calling security parameters in a SIP response message, such as a SIP RINGING message that may be modified using SDP to include the called security parameters.

A security key may be generated (block 750). For instance, called device 120 may generate a security key. In some implementations, called device 120 may generate a security key using a key generation function (e.g., a KDF), as described above. Additionally, or alternatively, the security key may be based on one or more security parameters. For instance, in some implementations, called device 120 may generate a security key by executing one or more KDFs based on one or more of the calling security parameters and/or one or more of the called security parameters.

While FIG. 7 shows a flowchart diagram of an example process 700 for generating a security key, in other implementations, a process for generating a security key may include fewer operations, different operations, differently arranged operations, or additional operations than depicted in FIG. 7.

Figure 8A:
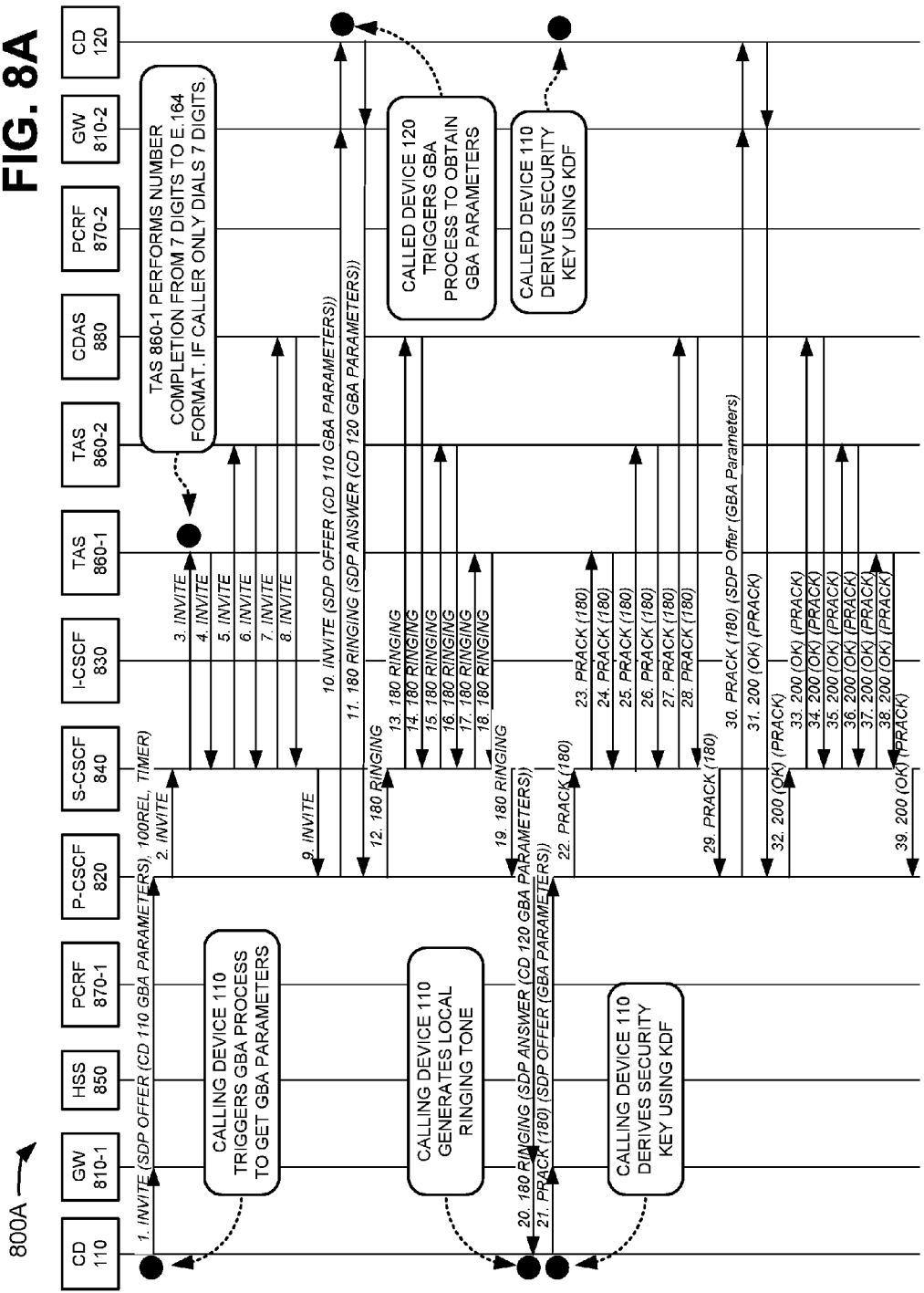

FIGS. 8A-8C are diagrams of an example call session 800 (referenced individually by 800A, 800B, and 800C, respectively) according to one or more implementations described herein. As depicted, call session 800 may involve calling device 110, called device 120, gateway 810-1, gateway 810-2, P-CSCF device 820, I-CSCF device 830, S-CSCF device 840, HSS 850, telephony application server (TAS) 860-1, TAS 860-2, policy charging and rules function (PCRF) device 870-1, PCRF device 870-2, and call delivery application server (CDAS) 880. While FIGS. 8A-8C represent a particular number and arrangement of devices, operations, and data structures, in alternative implementations, a call session may include additional devices, operations, and data structures, fewer devices, operations, and data structures, different devices, operations, and data structures, or differently arranged devices, operations, and data structures than those depicted in FIGS. 8A-8C.

Referring to FIG. 8A, call session 800A may begin with calling device 110 triggering a GBA function (e.g., a BSF) to obtain GBA parameters (e.g., a CALLING_B-TID parameter, a CALLING_Ks-ext_NAF parameter, or other types of security parameters). In some implementations, this may include calling device 110 communicating with application authentication architecture 140 and receiving one or more security parameters, such as a CALLING_B-TID parameter, a CALLING_Ks-ext-NAF parameter, or another type of security parameter. Additionally, or alternatively, calling device 110 may register with network 210 before triggering the GBA (see, for example, FIG. 6, blocks 610 and 620).

Calling device 110 may send a session initiation message that includes the GBA parameters (event 1). The session initiation message may include a SIP INVITE 100rel, timer message that is modified with SDP to include the GBA parameters. As depicted, the session invitation message may be routed to various devices, including P-CSCF device 820, S-CSCF device 840, TAS 860-1 (which may perform number completion from 7 digits to E.164 format), TAS 860-2, and CDAS 880 (events 2-9). The session initiation message may arrive at called device 120 via gateway 810-2 (event 10).

Similar to calling device 110, called device 120 may trigger a GBA process to obtain GBA parameters, such as a CALLED_B-TID, a CALLED_Ks-ext-NAF, or one or more other types of security parameters (see, for example, FIG. 7, block 730). As depicted, called device 120 may communicate a SIP RINGING message (180) that has been modified with SDP to include the GBA parameters obtained by called device 120 (event 11). The SIP RINGING message may be passed to several network devices, including P-CSCF device 820, S-CSCF device 840, CDAS 880, TAS 860-2, and TAS 860-1 (events 12-19). The SIP RINGING message may arrive at calling device 110 via gateway 810-1 (event 20), which may result in calling device 110 generating a local ringing tone.

At this point, calling device 110 and calling device 120 may each derive or otherwise calculate a security key using, for example, a KDF. As depicted, calling device 110 may produce a SIP provisional acknowledgement (PRACK) message in response to the SIP RINGING message from called device 120 (event 21). The SIP PRACK message may be modified to include GBA parameters. Additionally, or alternatively, the SIP PRACK message may be communicated to various network devices including P-CSCF device 820, S-CSCF device 840, TAS 860-1, TAS 860-2, and CDAS 880 (events 22-29). The SIP PRACK message may arrive at called device 120 via gateway 810-2 (event 30).

Called device 120 may communicate a SIP OK message (200) in response to the SIP PRACK message of calling device 110. Similar to several of the SIP messages discussed above, the SIP OK message may be communicated to several network devices. For example, the SIP OK message may be sent to P-CSCF device 820, S-CSCF device 840, CDAS 880, TAS 860-2, and TAS 860-1 (events 31-39).

Referring to FIG. 8B, the SIP OK message from called device 120 may arrive at calling device 110 via gateway 810-1 (event 40). Called device 120 may also, or alternatively, communicate a SIP OK (200) message corresponding to the SIP INVITE message of calling device 110, which may be received by P-CSCF 820 (event 41).

As depicted, an authentication authorization request (AAR) message and an authentication authorization answer (AAA) message may be exchanged between P-CSCF 820 and PCRF 870-2 via an Rx interface. Additionally, a re-authentication request (RAR) message and re-authentication answer (RAA) message may be exchanged between PCRF device 870-2 and gateway 810-2 via a Gx interface.

The SIP OK message corresponding to the SIP INVITE message may be sent to S-CSCF 840, CDAS 880, TAS 860-2, TAS 860-1, and again to S-CSCF device 840 and P-CSCF device 820 (events 42-49). Similar to the Rx and Gx interface exchanges mentioned above, an authentication authorization request (AAR) message and an authentication authorization answer (AAA) message may be exchanged between P-CSCF 820 and PCRF 870-1 via an Rx interface. Additionally, a re-authentication request (RAR) message and re-authentication answer (RAA) message may be exchanged between PCRF device 870-1 and gateway 810-1 via a Gx interface.

The SIP OK message corresponding to the SIP INVITE message may be received by calling device 110 (event 50). At this stage, calling device 110 and called device 120 may begin encrypting and decrypting a voice payload of the call session using the previously generated security keys. As depicted, a SIP acknowledgement (ACK) message may be sent from calling device 110 to called device 120 via a sequence of transmissions (events 51-60) that is similar to the communications described above.

Referring to FIG. 8C, a SIP BYE message may also be sent from calling device 110 to called device 120 using a similar sequence of transmission (events 61-70). As the SIP BYE message is being transmitted to called device 120, session termination request (STR) messages and session termination answer (STA) messages may be exchanged between P-CSCR device 820 and PCRF device 870-1 and between P-CSCR device 820 and PCRF device 870-1, via Rx interfaces. Similarly, RAR message and RAA messages may be exchanged between PCRF 870-1 and GW 810-1 and between PCRF 870-2 and GW 810-2, via Gx interfaces. In response to the SIP BYE message, called device 120 may communicate a SIP OK (200) message, which may use a sequence of transmissions similar to those discussed above (events 71-81).

In one or more implementations, described herein, devices may be used to generate security keys locally. For instance, calling device 110 may receive calling security parameters by registering with network 210 and interacting with application authentication architecture to demonstrate that calling device 110 is authorized to access a particular network service (e.g., a VoIP service) and/or use a particular communication application (e.g., a VoIP application). Calling device 110 may communicate the calling security parameters to called device 110 and, in response, receive called security parameters from called device 110. Calling device 110 and called device 120 may each execute a key generation function based on the calling security parameters and the called security parameters to locally generate security keys that may be used to encrypt and/or decrypt information passed between calling device 110 and called device 120.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a component that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   obtaining, by a calling device, calling security parameters;
   sending, by the calling device and to a called device, a first message that includes the calling security parameters, wherein the first message includes a session initiation protocol (SIP) message that has been modified using session description protocol (SDP) to include the calling security parameters;
   receiving, at the calling device and from the called device, a second message that includes called security parameters, wherein the second message includes a SIP message that has been modified using SDP to include the called security parameters;

deriving, by the calling device, a security key using the calling security parameters and the called security parameters;

receiving, at the calling device and from the called device, an acknowledgement message in response to the first message; and using, by the calling device, the derived security key to encrypt and decrypt communications between the calling device and the called device.

2. The method of claim 1, wherein the first message includes a SIP INVITE message.

3. The method of claim 1, wherein the second message includes a SIP RINGING message.

4. The method of claim 1, wherein deriving the security key includes calculating the security key using a key derivation function based on the calling security parameters and the called security parameters.

5. The method of claim 1, further comprising:
sending a SIP provisional acknowledgement (PRACK) message in response to receiving the second message.

6. The method of claim 5, further comprising:
receiving, from the called device, an acknowledgement in response to sending the SIP PRACK message.

7. The method of claim 1, wherein obtaining the calling security parameters includes triggering a generic bootstrap architecture (GBA) function to obtain GBA parameters.

8. A non-transitory computer-readable medium storing instructions, the instructions comprising:
one or more instructions that, when executed by a processor, cause the processor to:
receive, from a calling device, a first message that includes calling security parameters, wherein the first message includes a session initiation protocol (SIP) message that has been modified using session description protocol (SDP) to include the calling security parameters;
obtain called security parameters;
send, to the calling device, a second message that includes the called security parameters, wherein the second message includes a SIP message that has been modified using SDP to include the called security parameters;
derive a security key using the calling security parameters and the called security parameters;
send, to the calling device, an acknowledgement message in response to the first message; and
use the derived security key to encrypt and decrypt communications between the calling device and the called device.

9. The non-transitory computer-readable medium of claim 8, wherein the first message includes a SIP INVITE message.

10. The non-transitory computer-readable medium of claim 8, wherein the second message includes a SIP RINGING message.

11. The non-transitory computer-readable medium of claim 8, wherein the one or more instructions that cause the processor to derive the security key include one or more instructions that cause the processor to calculate the security key using a key derivation function based on the calling security parameters and the called security parameters.

12. The non-transitory computer-readable medium of claim 8, wherein the instructions further comprise:
one or more instructions that cause the processor to receive, from the calling device, a SIP provisional acknowledgement (PRACK) message in response to sending the second message.

13. The non-transitory computer-readable medium of claim 12, wherein the instructions further comprise:
one or more instructions that cause the processor to send, to the calling device, an acknowledgement in response to receiving the SIP PRACK message.

14. The non-transitory computer-readable medium of claim 8, wherein the one or more instructions that cause the processor to obtain the called security parameters include one or more instructions that cause the processor to trigger a generic bootstrap architecture (GBA) function to obtain GBA parameters.

15. A device comprising:
one or more processors configured to:
obtain calling security parameters;
send, to a called device, a first message that includes the calling security parameters, wherein the first message includes a session initiation protocol (SIP) message that has been modified using session description protocol (SDP) to include the calling security parameters;
receive, from the called device, a second message that includes called security parameters, wherein the second message includes a SIP message that has been modified using SDP to include the called security parameters;
derive a security key using the calling security parameters and the called security parameters;
receive, from the called device, an acknowledgement message in response to the first message; and
use the derived security key to encrypt and decrypt communications between the calling device and the called device.

16. The device of claim 15, wherein the first message includes a SIP INVITE message.

17. The device of claim 15, wherein the second message includes a SIP RINGING message.

18. The device of claim 15, wherein, when deriving the security key, the one or more processors are further configured to calculate the security key using a key derivation function based on the calling security parameters and the called security parameters.

19. The device of claim 15, wherein the one or more processors are further configured to:
send a SIP provisional acknowledgement (PRACK) message in response to receiving the second message; and
receive, from the called device, an acknowledgement in response to sending the SIP PRACK message.

20. The device of claim 15, wherein, when obtaining the calling security parameters, the one or more processors are further configured to trigger a generic bootstrap architecture (GBA) function to obtain GBA parameters.

* * * * *